United States Patent
Dixon et al.

(10) Patent No.: US 11,279,194 B2
(45) Date of Patent: Mar. 22, 2022

(54) DAMPER WITH RESERVOIR

(71) Applicants: ThyssenKrupp Bilstein of America Inc., Poway, CA (US); thyssenkrupp AG, Essen (DE)

(72) Inventors: Alexander Dixon, Cincinnati, OH (US); Bill Bryant, West Chester, OH (US); Chad Smith, Waynesville, OH (US); Clayton Kantner, Loveland, OH (US)

(73) Assignees: THYSSENKRUPP BILSTEIN OF AMERICA INC., Poway, CA (US); THYSSENKRUPP AG, Essen (DE)

( * ) Notice: Subject to any disclaimer, the term of this patent is extended or adjusted under 35 U.S.C. 154(b) by 188 days.

(21) Appl. No.: 16/838,148

(22) Filed: Apr. 2, 2020

(65) Prior Publication Data

US 2021/0309062 A1 Oct. 7, 2021

(51) Int. Cl.
*B60G 13/06* (2006.01)
*F16F 9/32* (2006.01)

(52) U.S. Cl.
CPC ............ *B60G 13/06* (2013.01); *F16F 9/3257* (2013.01)

(58) Field of Classification Search
CPC ........ B60G 13/06; B60G 13/08; B60G 17/08; B60G 2202/24; B60G 2204/112; B60G 2400/102; B60G 2400/202; B60G 2500/10; F16F 9/18; F16F 9/19; F16F 9/34; F16F 9/44; F16F 9/46; F16F 9/53; F16F 9/342; F16F 9/464; F16F 9/468; F16F 9/3257
USPC ..................................................... 188/266.1
See application file for complete search history.

(56) References Cited

U.S. PATENT DOCUMENTS

| | | | |
|---|---|---|---|
| 10,941,828 B2* | 3/2021 | Franklin | F16F 9/46 |
| 2007/0039790 A1* | 2/2007 | Timoney | F16F 9/06 |
| | | | 188/266.1 |
| 2012/0222927 A1* | 9/2012 | Marking | B60G 17/08 |
| | | | 188/274 |
| 2013/0228404 A1* | 9/2013 | Marking | F16F 9/065 |
| | | | 188/266.2 |
| 2017/0037923 A1* | 2/2017 | Sirven | B60G 17/08 |
| 2017/0267044 A1* | 9/2017 | Evans | F16F 9/3482 |
| 2018/0010666 A1* | 1/2018 | Marking | F16F 9/19 |
| 2018/0334005 A1* | 11/2018 | Evans | F16F 9/19 |
| 2020/0114719 A1* | 4/2020 | Marking | F16F 9/43 |

FOREIGN PATENT DOCUMENTS

CN 110762151 A * 2/2020

* cited by examiner

*Primary Examiner* — Robert A. Siconolfi
*Assistant Examiner* — San M Aung
(74) *Attorney, Agent, or Firm* — thyssenkrupp North America, LLC

(57) ABSTRACT

A damper with a main damper assembly includes a damper tube with a damping fluid. A main working piston divides a main fluid chamber into a piston rod side and a non-piston rod side. The main fluid chamber has an upper zone, a lower zone and a mid-zone. A secondary damper assembly with a secondary working piston is in fluid communication with the main damper assembly. When the main working piston travels in the mid-zone, fluid is caused to pass through the main working piston and the secondary working piston to generate a first damping force and when the main working piston travels in either of the upper and lower zone, fluid is caused to pass only through the main working piston to generate a second damping force, wherein the first damping force is less than the second damping force.

14 Claims, 5 Drawing Sheets

DAMPER WITH RESERVOIR

FIELD

The present invention relates to vibration dampers for motor vehicles.

BACKGROUND

When an automotive vehicle encounters an irregularity on a roadway, springs in the vehicle suspension system compress and expand to absorb shock. Since the springs tend to continue to vibrate after accommodating to the irregularity, the spring vibration reduces the road-holding ability of the vehicle and riding comfort. A shock absorber is used dampen and arrest the spring vibration to provide more control of the motion of the affected wheel or wheels and the vehicle itself, resulting in better road holding capability and better riding comfort.

In shock absorbers, also known as dampers or vibration dampers, for automotive vehicles, the total length of the absorber should be as short as possible from the standpoint of mounting space within the vehicle body. However, the stroke of the piston rod must be as long as possible to absorb vibration energy (the product of damping force and stroke). Further, it is often desirable for vehicle dampers to be constructed so as to generate damping forces that change as a function of the damper travel. In particular, it is desirable to generate increased damping forces at the damper travel extremes to better control the motion of the corresponding vehicle wheel when the damper is nearly fully compressed and nearly fully extended.

In the field of dampers, variable damping can be generated in several ways. In one example, the use of rebound cut-off (RCO) and jounce cut-off (JCO) components are able to provide a specified position dependent damping in conventional full-length damper assemblies. In variable-damping-force shock absorbers, however, additional damper length to mount various elements for adjusting damping force is inevitably required relative to more conventional dampers.

There is a need, therefore, to provide position dependent damping that overcome the shortcomings of present dampers. The present invention satisfies the need.

SUMMARY

An aspect of the invention is a damper including a main damper assembly with a damper tube and a damping fluid, the damper tube defines a main fluid chamber. A piston rod is retractable and extendable in the damper tube. A main working piston is attached to the piston rod and divides the main fluid chamber into a piston rod side and a non-piston rod side. The main working piston includes flow channels formed therethrough in communication with the piston rod side and the non-piston rod side. An upper port is formed through the damper tube. A lower port is formed through the damper tube and is spaced apart from the upper port. An upper zone is defined at one end of the main fluid chamber by the upper port and a lower zone is defined at an end of the main fluid chamber opposite the upper zone by the lower port. A mid-zone is defined between the upper zone and the lower zone. A secondary damper assembly in fluid communication with the main damper assembly includes a secondary damper tube defining a secondary fluid chamber. A secondary working piston is fixed in position in the secondary fluid chamber and includes flow channels formed therethrough, the secondary working piston divides the secondary fluid chamber into an upper volume and a lower volume. A secondary upper port is in communication with the upper port of the main damper assembly and the upper volume. A secondary lower port is in communication with the lower port of the main damper assembly and the lower volume. The spacing of the upper port and the lower port is configured such that when the main working piston travels in the mid-zone, fluid is caused to pass through both the flow channels of the main working piston and the secondary working piston to generate a first damping force, and when the main working piston travels in either of the upper and lower zone, fluid is caused to pass only through the flow channels of the main working piston to generate a second damping force. The first damping force is less than the second damping force.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

For purposes of the description hereinafter, the terms "upper, lower, right, left, vertical, horizontal, top, bottom, lateral, longitudinal" and other terms of orientation or position and derivatives thereof, shall relate to the invention as it is depicted in the figures. The term "configured" or "configuration" will be understood as referring to a structural size and/or shape. It is to be understood that the invention may assume alternative variations and step sequences, except where expressly specified to the contrary. It is also to be understood that the specific systems and processes illustrated in the attached drawings, and described in the following specification, are simply exemplary examples of the invention. Hence, specific dimensions and other physical characteristics related to the examples disclosed herein are not to be considered as limiting.

Figure 1:
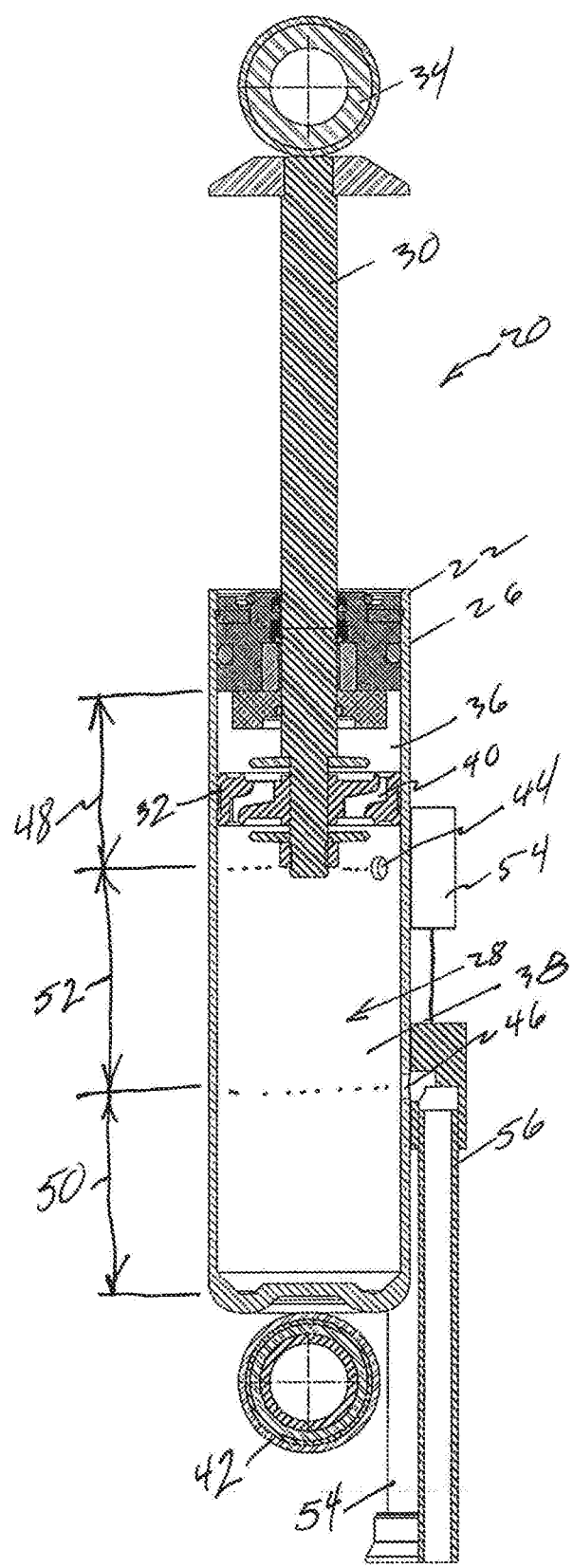
FIG. 1 is a cross-sectional view of a main damper assembly according to the disclosure in an extended state.
Figure 2:
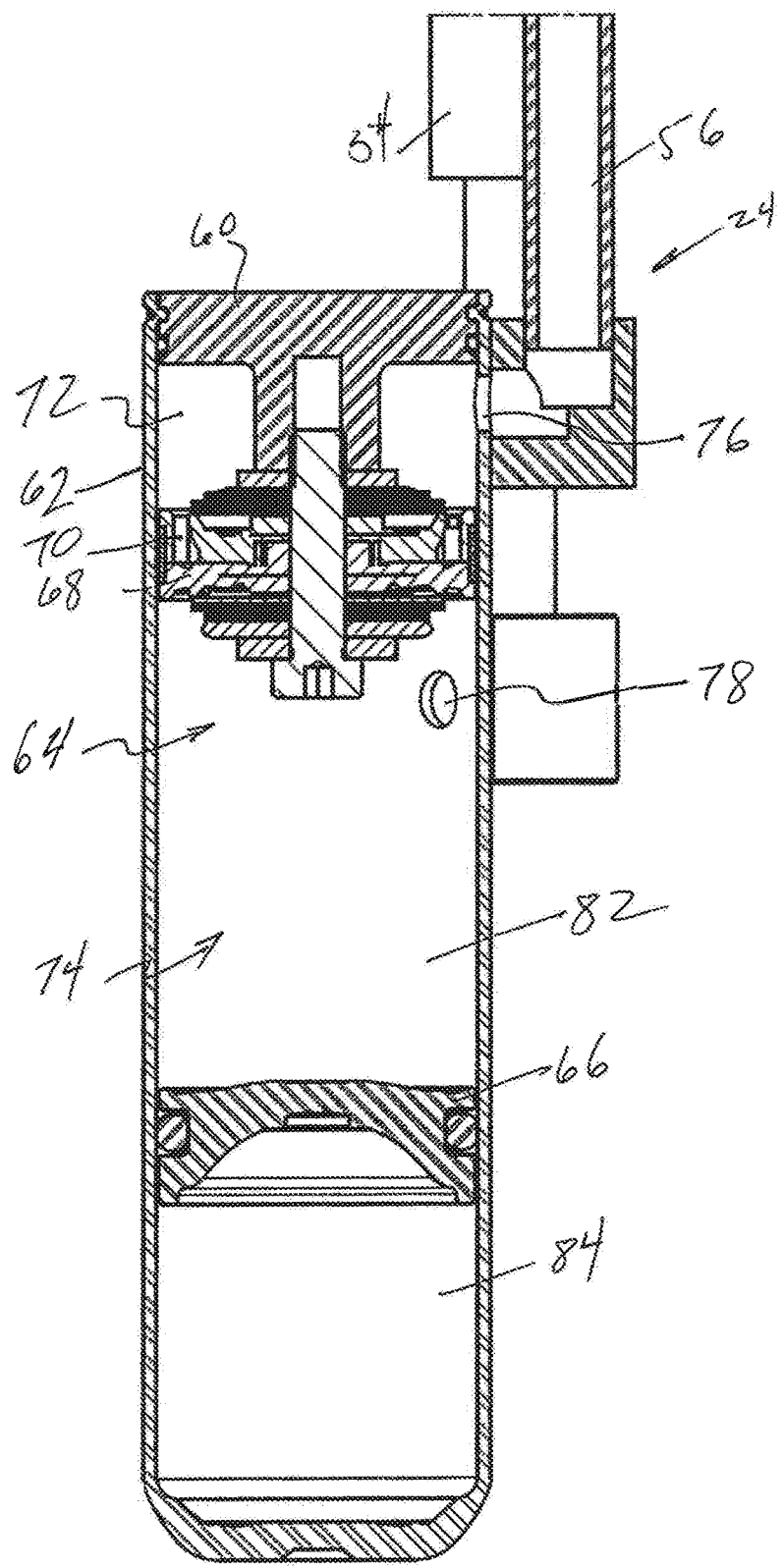
FIG. 2 is a cross-sectional view of a damper reservoir according to the disclosure for use with the main damper assembly of FIG. 1.

An example of a damper 20 according to the disclosure is shown in the combination of FIGS. 1 and 2. The damper 20 includes two main elements: a main damper assembly 22 in fluid communication with a secondary damper assembly 24. The main damper assembly 22 is generally in the form of a monotube shock absorber and includes a damper tube 26.

The damper tube 26 may be cylindrical or any other suitable shape and formed of any suitable material, such as metal materials, steel, titanium, aluminum, composite materials, and combinations thereof. The damper tube 26 may include a mount 42 for attaching the damper tube part of the damper 20 to a vehicle (not shown). The damper tube 26 encloses a fluid space or main fluid chamber 28, which is filled, at least in part, with hydraulic fluid, such as oil. The main damper assembly 22 shown in FIG. 1 will be considered to be in an extended state. In contrast, the main damper assembly 22 shown in FIG. 3 will be considered to be in a compressed state.

A piston rod 30, one end of which is disposed within the main fluid chamber 28 and carries a main working piston 32, and the other end of which includes a mount 34, which is configured to attach to a vehicle. The rod 30 and main working piston 32 are configured, as is conventional, to reciprocate within the main fluid chamber 28. The main working piston 32 divides the main fluid chamber into a piston rod side or first fluid chamber 36 and a non-piston rod side or second fluid chamber 38.

The main working piston 32 is provided with suitable flow channels and valve mechanisms 40, such as ports and disc valves, for controlling the flow of fluid through the main working piston in a well-known manner. When the vehicle encounters an irregularity on a road surface over which it is traveling, the mounts 34, 42 are caused to move closer and/or farther apart, which in turn causes the piston rod 30 to move within the damper tube 26, which causes the main working piston 32 to reciprocate within the main fluid chamber 28 and for fluid to be urged through the flow channels and valve mechanisms 40 to generate damping forces, as is well known.

The disclosed main damper assembly 22 is distinguished from conventional vibration dampers in that the damper tube 26 includes a pair of spaced-apart ports 44, 46 that are formed, for example, through the damper tube. The upper or first port 44 is positioned in communication with, assuming that the main working piston 32 is located midway in the damper tube 26 between a fully compressed and fully extended state, the piston rod side 36 of the main fluid chamber 28. The lower or second port 46 is positioned in communication with, assuming that the main working piston 32 is located midway in the damper tube 26 between a fully compressed and fully extended state, the non-piston rod side 38 of the main fluid chamber 28.

Figure 3:
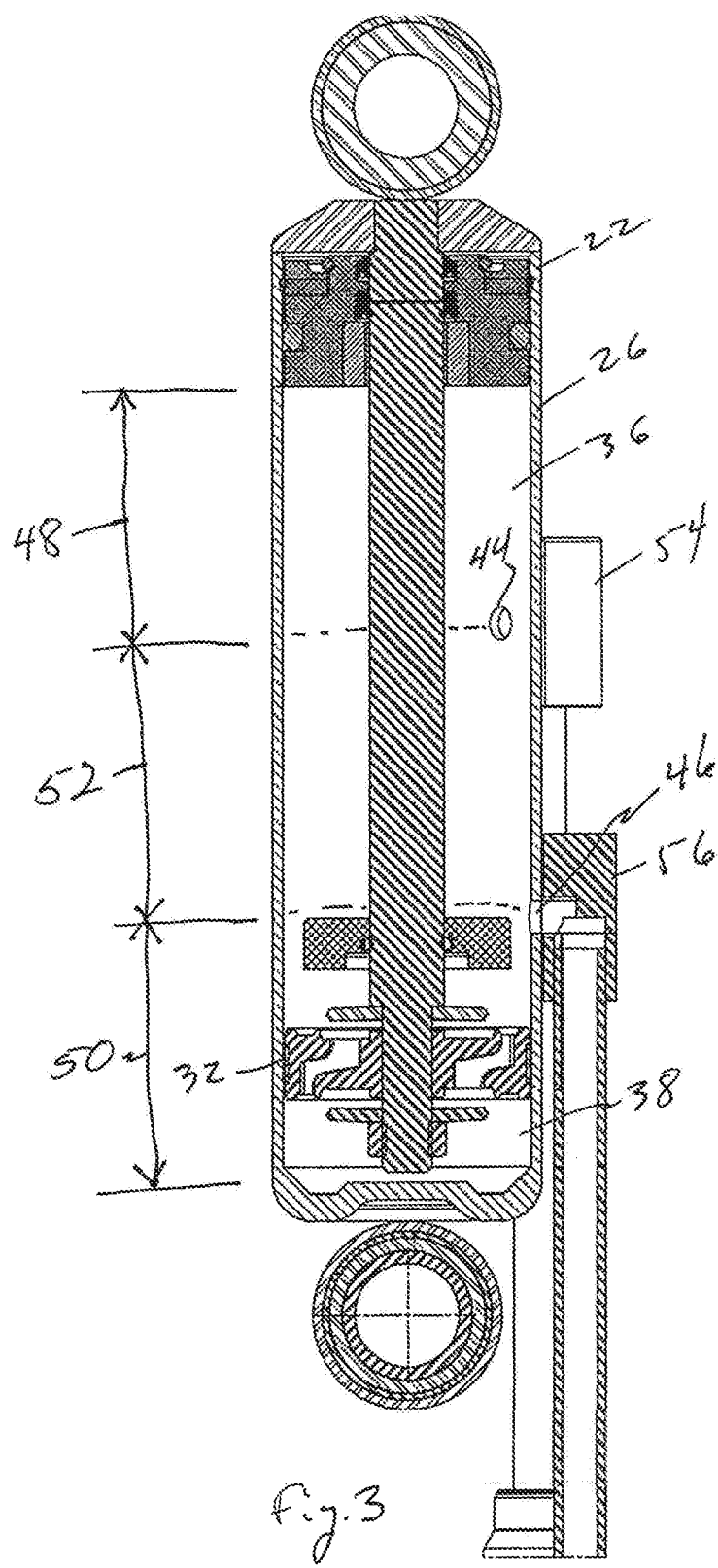
FIG. 3 is a cross-sectional view of the main damper assembly of FIG. 1 in a compressed state.

Referring to FIGS. 1 and 3, the first and second ports 44, 46 may be considered to define the main fluid chamber 28 into an upper zone 48 above the first port, a lower zone 50 below the second port, and a mid-zone 52 located between the first and second ports, with the nomenclature of the named features related to the invention as it is depicted in the figures. For example, the position of the main working piston 32 in FIG. 1 is shown in the upper zone 48. The position of the main working piston 32 in FIG. 3 is shown in the lower zone 50.

The main damper assembly 22 further includes an upper conduit 54 in fluid communication with the upper port 48 and a lower conduit 56 in fluid communication with the lower port 46. In the illustrated example, the upper and lower conduits 54, 56 are exterior to the damper tube 26. The conduits 54, 56 may be flexible hydraulic tubing configured to transmit the fluid pressure in and out of the main damper assembly 22. Alternatively, the conduits 54, 56 may be non-flexible tubing of metal or any suitable material.

FIG. 2 shows the other part of the damper 20 of the present disclosure. In particular, FIG. 2 shows a secondary damper assembly 24. The secondary damper assembly 24 is configured to be in fluid communication with the main damper assembly 22 via the upper and lower conduits 54, 56 in the present example. The main and secondary damper assemblies 22, 24 work together, as will be described in detail herein, to generate a variable damping force as a function of the position of the main working piston 32 in the main damper assembly 22.

The secondary damper assembly 24 includes a secondary damper tube 62 which is similar in construction to the damper tube 26 of the main damper assembly 22. The secondary damper tube 62 and an end cap 60, which is configured to close the secondary damper tube, together define a secondary fluid chamber 64.

The end cap 60 seals to the secondary damper tube 62. A secondary working piston 68 is fixedly connected to the end cap 60 such that its position is fixed within the secondary damper tube 62. The secondary working piston 68 may be fixed to the end cap 60 for example by a conventional fastener or may be fixed in position in any suitable manner.

The secondary working piston 68 is provided with suitable flow channels and valve mechanisms 70, such as ports and disc valves, for controlling the flow of fluid through the secondary working piston in a well-known manner. Since the secondary working piston 68 is fixed in position within the secondary damper tube 62, fluid flow through the secondary working piston depends not on the generation of different fluid pressures on opposite sides of the piston by movement of the piston in the secondary damper assembly 24, but rather the presence of different fluid pressures on opposite sides on the piston from the main damper assembly 22, as will be explained more fully herein.

The secondary working piston 68 divides the secondary fluid chamber 64 into an upper volume 72 between the end cap 60 and the working piston 68, and a lower volume 74 on the side of the piston opposite the upper volume. A floating piston 66 may be disposed in the lower volume 74 and sealingly and movably engaged with the secondary damper tube 62 so as to divide the lower volume into a lower volume fluid chamber 82 and a lower volume gas chamber 84. The use of and function of a floating piston 66 in a monotube damper assembly is well-known.

The upper volume 72 is in fluid communication with the upper conduit 54 and therefore the top port 44 of the main damper assembly 22. The lower volume fluid chamber 82 of the lower volume 74 is in fluid communication with the lower conduit 56 and therefore with the lower port 46 of the main damper assembly 22. It will be understood that, depending on performance requirements, the connections of the various ports and volumes may be reversed relative to those depicted. For example, whichever port (44 or 46) is connected to secondary upper port 76 will permit the secondary working piston 68 to act as a bottom valve.

Fluid flow from the upper conduit 54 entering and exiting the upper volume 72 passes through a secondary upper port 76. Fluid flow from the lower conduit 56 entering and exiting the lower volume fluid chamber 82 passes through a secondary lower port 78.

When the main working piston 32 of the main damper assembly is positioned between the upper and lower port 44, 46, i.e. in mid-zone 52, any changes in position with the damper tube 26 creates a differential pressure in the piston rod side and non-piston rod side chambers 36, 38. The directionality of the pressure differential is a function of the direction of movement of the main working piston 32. The pressures thus generated are conveyed through the upper and lower ports 44, 46, the upper and lower conduit 54, 56 and enter the secondary damper assembly 24 through respective secondary upper and secondary lower ports 76, 78. The fluid pressures thus conveyed cause fluid to flow in a direction through the secondary working piston 68 from high to low pressure. At the same time that fluid is passing through the secondary working piston 68, fluid is passed through the main working piston 32. Thus, the combined area of the flow passages 40, 70 is utilized when the main working piston 32 operates in the mid-zone 52 of the main damper assembly. Fluid flow through the combined area 40, 70 generates a first damper force.

In contrast to the operation of the damper in the mid-zone 52, whereby a relative low amount of damping is generated, the damper 22 operates differently, generating a relatively higher amount of damping force, when the main working piston 32 moves into the travel extremes. When the working piston 32 moves within the upper zone 48 or the lower zone 50 both upper and lower ports 44, 46 are in communication with the same chamber and see the same fluid pressure. In this working state there is no significant pressure differential across the two ports and there is little or no resulting fluid flow into/out of the secondary damper assembly 24. Fluid may still flow into the secondary damper 24 when the volume of the piston rod 30 is introduced into the system, however there is no resulting pressure differential across the secondary working piston 68, and therefore fluid takes the path of least resistance (only through the lower port 78) and does not contribute to the reduction of damping force as seen when the main piston is in zone 52.

Accordingly, when the working piston 32 moves within the upper or lower zone 48, 50 fluid flows only through the main working piston 32 and is only subject to the area provided by the flow channels in the main working piston. Since there is less area in the main working piston 32 relative to the combined area of the main and secondary working pistons, the amount of resistance to flow is correspondingly higher in the operating state of the damper when in the upper or lower zone 48, 50. Greater damping is therefore generated by the main working piston 32 when in the upper or lower zone 48, 50, and the damper 20 exhibits a desired variable damping quality as a function of the main working piston 32 travel.

Figure 4:
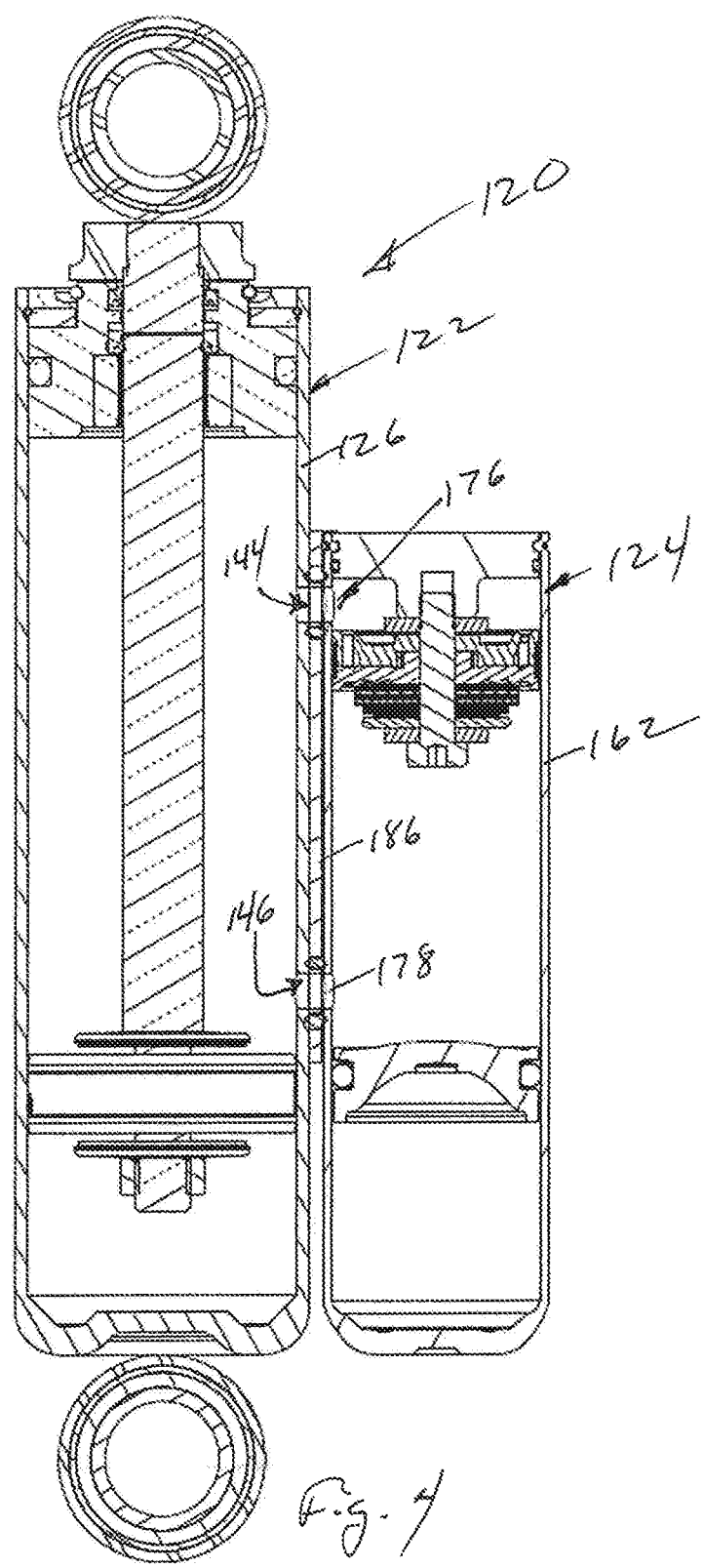
FIG. 4 is a cross-sectional view of a main damper assembly and attached damper reservoir according to the disclosure.

The damper 120 of FIG. 4 is the same in operation as the above-detailed damper. However, the structural configuration of the main damper assembly 122 and the secondary damper assembly 124 is that of a "piggy-back" damper. Thus, instead of the secondary damper assembly 124 being fluidly connected to the main damper assembly 122 via hydraulic hoses or pipes, for example, the secondary damper tube 162 of the secondary damper assembly is connected to the damper tube 126 of the main damper assembly in a side-by-side arrangement. The secondary damper tube 162 of the secondary damper assembly 124 may be directly connected to the damper tube 126 of the main damper assembly 122 or indirectly connected thereto by a connecting flange, bracket or any suitable connector, frame member, or structural element 186 or plurality of structural elements. The connecting flange 186 may be configured to physically and/or fluidly connect port pair 144 and 176 to each other and port pair 146 and 178 to each other.

In the illustrated damper 120, the upper port 144 is aligned with and in communication with the secondary upper port 176 and the lower port 146 is aligned with an in communication with the secondary lower port 178. In all other aspects the damper 120 of FIG. 4 is the same as in the damper 20 of FIGS. 1-3. As in the above example, however, the orientation of secondary damper tube 162 may be reversed such that upper port 144 may be connected with secondary lower port 178 and lower port 146 connects to secondary upper port 176.

Figure 5:
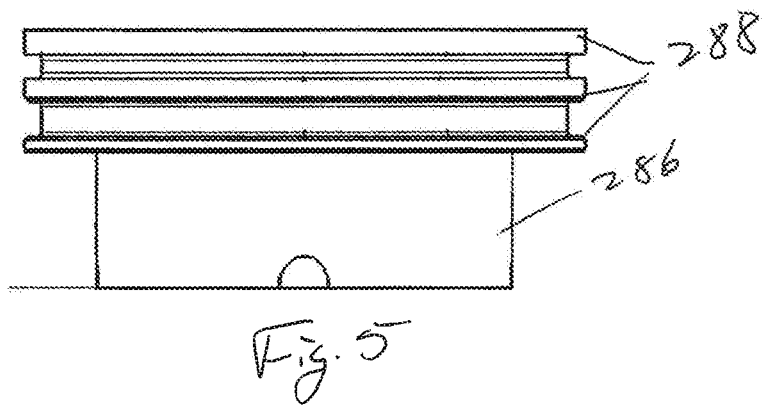
FIG. 5 is a side view of a cap for use with the damper reservoir of the disclosure.
Figure 6:
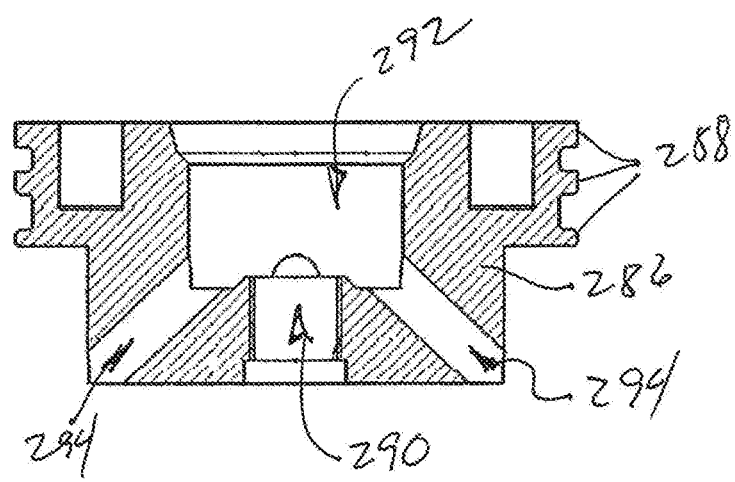
FIG. 6 is a cross-sectional view of the cap of FIG. 5.
Figure 7:
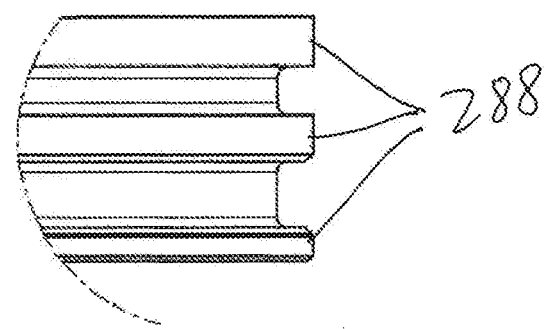
FIG. 7 is a partial close-up, side view of the cap of FIG. 5.

FIGS. 5-7 illustrate an alternative end cap 260 and an alternative means of fluidly connecting a main damper with a second damper as detailed above. Specifically, the end cap 260 includes a generally cylindrical body 286 and flanges 288 formed on an end thereof. The flanges are shaped and sized to receive seals, such as O-seals (not shown) wherein the uppermost and smaller opening is shaped and sized for a crimp to retain the end cap within the secondary tube or alternatively retention with a snap ring (not shown) is also contemplated. An axial bore 290 is formed through the body 286 for receiving a fastener (not shown) for fixing a working piston (see FIG. 4, for example) thereto. A counterbore 292 is formed at an outer portion of the bore 290 for receiving a hose via a connection, for example a SAE J1926 ORB-8 threaded connection. Fluid passages 294 fluidly connect the counterbore 292 with the interior fluid chamber of a secondary damper (see e.g., FIGS. 1-4) to produce the same fluid flow delivered by the secondary upper port of the device according to FIGS. 1-4.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A damper, comprising:
   a main damper assembly comprising:
      a damper tube comprising a damping fluid, the damper tube defining a main fluid chamber;
      a piston rod that is retractable and extendable in the damper tube;
      a main working piston attached to the piston rod and divides the main fluid chamber into a piston rod side and a non-piston rod side;
      wherein an upper zone is defined at one end of the main fluid chamber and a lower zone is defined at an end of the main fluid chamber opposite the upper zone, and a mid-zone is defined between the upper zone and the lower zone; and a secondary damper assembly in fluid communication with the main damper assembly, comprising:
a secondary damper tube defining a secondary fluid chamber;
a secondary working piston disposed in the secondary fluid chamber and including flow channels formed therethrough;
wherein the main damper is configured such that when the main working piston travels in the mid-zone, fluid is caused to pass through the main working piston and the secondary working piston to generate a first damping force and when the main working piston travels in either of the upper and lower zone, fluid is caused to pass only through the main working piston to generate a second damping force, wherein the first damping force is less than the second damping force.

2. The damper of claim 1, wherein the main damper assembly includes mounts configured to attach to a vehicle.

3. The damper of claim 2, wherein the secondary damper assembly is fluidly in communication with the main damper assembly via an upper conduit and a lower conduit.

4. The damper of claim 2, wherein the secondary damper assembly is configured as a piggyback reservoir.

5. The damper of claim 4, wherein the secondary damper tube is attached to the damper tube.

6. The damper of claim 5, wherein the secondary damper tube is attached to the damper tube in a side-by-side configuration.

7. The damper of claim 1, comprising an upper port and a lower port, the upper and lower ports formed through the damper tube and defining a mid-zone therebetween, and wherein the upper zone is defined within the damper tube at one end thereof, and the lower zone is defined with the damper tube opposite the upper zone.

8. The damper of claim 1, wherein the secondary working piston is fixed in position with the secondary damping tube.

9. The damper of claim 8, wherein the secondary working piston divides a secondary fluid chamber of the secondary damping tube into an upper volume on one side thereof and a lower volume on an opposite side thereof.

10. The damper of claim 9, wherein the upper volume is in fluid communication with the upper zone and the lower volume is in fluid communication with the lower zone.

11. The damper of claim 10, wherein said fluid communication is through an upper conduit and a lower conduit.

12. The damper of claim 10, further comprising an end cap closing the secondary damper tube and defining the secondary fluid chamber with the secondary damper tube.

13. The damper of claim 12, wherein said upper conduit fluidly connects the upper zone of the main damper assembly to the upper volume of the secondary damper assembly.

14. A damper, comprising:
a main damper assembly comprising:
a damper tube comprising a damping fluid, the damper tube defining a main fluid chamber;
a piston rod that is retractable and extendable in the damper tube;
a main working piston attached to the piston rod and divides the main fluid chamber into a piston rod side and a non-piston rod side, the main working piston including flow channels formed therethrough in communication with the piston rod side and the non-piston rod side;
an upper port formed through the damper tube;
a lower port formed through the damper tube and spaced apart from the upper port;
wherein an upper zone is defined at one end of the main fluid chamber by the upper port and a lower zone is defined at an end of the main fluid chamber opposite the upper zone by the lower port, and a mid-zone is defined between the upper zone and the lower zone; and
a secondary damper assembly in fluid communication with the main damper assembly, comprising:
a secondary damper tube defining a secondary fluid chamber;
a secondary working piston fixed in position in the secondary fluid chamber and including flow channels formed therethrough, the secondary working piston dividing the secondary fluid chamber into an upper volume and a lower volume;
a secondary upper port in communication with the upper port of the main damper assembly and the upper volume; and
a secondary lower port in communication with the lower port of the main damper assembly and the lower volume;
wherein the spacing of the upper port and the lower port is configured such that when the main working piston travels in the mid-zone, fluid is caused to pass through both the flow channels of the main working piston and the secondary working piston to generate a first damping force; and
when the main working piston travels in either of the upper and lower zone, fluid is caused to pass only through the flow channels of the main working piston to generate a second damping force, wherein the first damping force is less than the second damping force.

* * * * *